United States Patent [19]
Molnar

[11] Patent Number: 5,887,035
[45] Date of Patent: Mar. 23, 1999

[54] METHOD FOR JOINT EQUALIZATION AND DETECTION OF MULTIPLE USER SIGNALS

[75] Inventor: Karl J. Molnar, Cary, N.C.

[73] Assignee: Ericsson, Inc., Research Triangle Park, N.C.

[21] Appl. No.: 962,249

[22] Filed: Oct. 31, 1997

[51] Int. Cl.$^6$ .................................................. H04L 27/06
[52] U.S. Cl. .......................................................... 375/340
[58] Field of Search ..................................... 375/340, 341, 375/229, 324; 371/43.1, 43.6

[56] References Cited

U.S. PATENT DOCUMENTS 5,432,818  7/1995  Lou ........................................ 375/340
5,502,735  3/1996  Cooper .................................. 375/340

Primary Examiner—Temesghen Ghebretinsae
Attorney, Agent, or Firm—Rhodes, Coats & Bennett, LLP

[57] ABSTRACT

An iterative approach is used to find maximum likelihood sequence estimates of a transmitted symbol sequence. Each possible transmitted signal is represented by an indicator vector which selects the transmitted symbol from a symbol library vector. Channel estimates are generated representing the estimated impulse response of the communication channel to each transmitted symbol. The channel estimates are used to form a matched medium response vector and an interaction matrix. The matched medium response vector represents the matched medium response of the receiver to both a transmitter and the channel for each transmitted symbol. The interaction matrix represents the ISI between symbols. The matched medium response vector and the interaction matrix are fed to an estimated symbol probability vector generator which calculates in an iterative manner the estimated symbol probability vectors corresponding to each transmitted symbol. The estimated symbol probability vectors can be output to a hard-decision generator which makes a hard-decision about the transmitted symbols. Alternatively, the estimated symbol probability vectors can be output to a soft-decision decoder.

19 Claims, 4 Drawing Sheets

METHOD FOR JOINT EQUALIZATION AND DETECTION OF MULTIPLE USER SIGNALS

FIELD OF THE INVENTION

The present invention relates generally to signal processing in a telecommunications system, and, more particularly, to methods for joint equalization and detection of symbol sequences.

BACKGROUND OF THE INVENTION

The basic function of a communication system is to send information from a source that generates the information to one or more destinations. In a radio communication system, a number of obstacles must be overcome to successfully transmit and receive information including channel distortion which may cause, for example, intersymbol interference (ISI) and additive noise. The receiver must compensate for the effects of channel distortion and the resulting intersymbol interference. This is usually accomplished by means of an equalizer/detector at the receiver.

A number of different equalization schemes have been used in the past to eliminate or minimize intersymbol interference. The most commonly used approaches include decision feedback equalization (DFE) and maximum likelihood sequence estimation (MLSE). In a maximum likelihood sequence estimation equalization scheme, a detector produces the most probable symbol sequence for the given received sample sequence. An algorithm for implementing maximum likelihood sequence detection is the Viterbi algorithm, which was originally devised for decoding convolutional codes. The application of the Viterbi algorithm to the problem of sequence detection in the presence of ISI is described by Gottfried Ungerboeck in "*Adaptive Maximum Likelihood Receiver for Carrier Modulated Data Transmission Systems*," IEEE Transactions on Communications, Volume COM-22, #5, May 1974. This MLSE approach employs a matched filter followed by a MLSE algorithm and an auxiliary channel estimation scheme.

A major drawback of using maximum likelihood sequence detection for communications channels which may experience intersymbol interference is that the computational complexity grows exponentially as a function of the span of the intersymbol interference and the number of interfering users. Consequently, maximum likelihood sequence detection is practical only for single user signals where the intersymbol interference spans only a few symbols. Therefore, there is great interest in finding new approaches to sequence estimation which reduce the computational complexity associated with maximum likelihood sequence detection.

SUMMARY OF THE INVENTION

The present invention provides an iterative method for generating estimates of a transmitted symbol sequence. The transmitted symbol sequence is received over a communication channel which may result in distortion of the waveform. Each possible transmitted symbol is represented by an indicator vector which is used to select a possible transmitted symbol from a symbol library vector. An estimate of the indicator vector, called the estimated symbol probability vector, is calculated and used to select an estimate of the transmitted symbol.

The t'th element of the estimated symbol probability vector is an estimate of the probability that the t'th symbol in the symbol library vector was transmitted. To form the estimated symbol probability vector, channel estimates are generated representing the estimated impulse response of the channel for each transmitted symbol. The channel estimates are used to form a matched medium response vector and an interaction matrix.

The matched medium response vector is formed by a combination of the received signal, the channel estimates, and the symbol library vector and represents the matched medium response component for the possible transmitted symbols in the symbol library vector. The interaction matrix is based upon the channel estimates and the symbol library vector and contains the interaction between interfering symbols. The matched medium response vector and the interaction matrix are used to derive the estimated symbol probability vector for each symbol in the transmitted symbol sequence. The estimated symbol probability vector is used to select an estimate of each transmitted symbol in said symbol sequence from the symbol library vector.

The estimated symbol probability vector is formed by recursively estimating each element of each estimated symbol probability vector based upon the matched medium response vector, the interaction matrix and a previous estimate of the estimated symbol probability vector. The recursive estimation of each element of each estimated symbol probability vector is performed until some pre-defined convergence criteria is satisfied or for a pre-determined number of iterations. The recursive nature of the estimation process results in maximum a posteriori estimates of the indicator vector which may be used to select an estimate of the transmitted symbol from the symbol library vector.

The primary advantage of the present invention is a reduction in overall complexity. Using the iterative approach of the present invention, the state space is of the order $(N_u \times N_b)$ as opposed to $N_b^{N_u}$ in the conventional Viterbi algorithm. This reduction in overall complexity is at the expense of using multiple iterations in the algorithm. The reduction in computational complexity allows for joint demodulation of multiple user signals simultaneously.

DETAILED DESCRIPTION OF THE INVENTION

Figure 1:
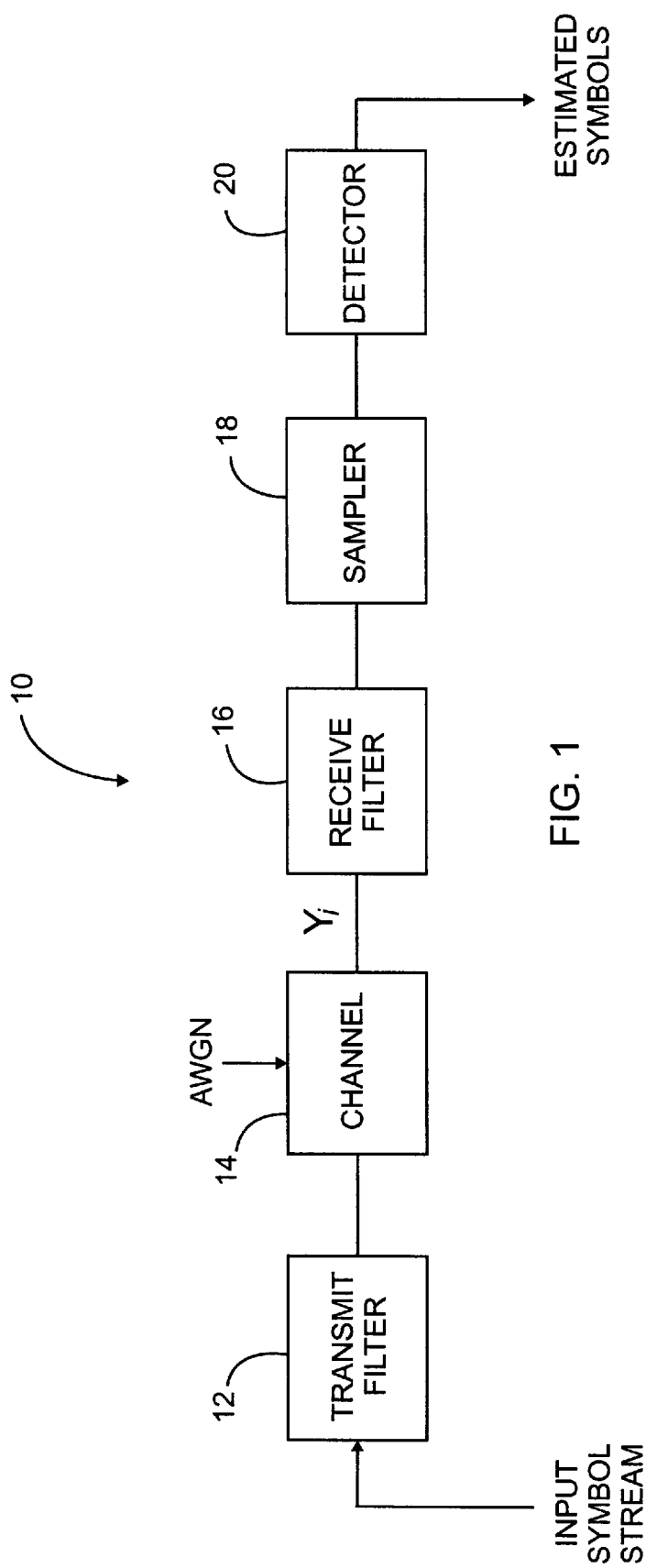
FIG. 1 is a block diagram of a digital communication system.

FIG. 1 illustrates a radio transmission system for digital signal transmission. The system consists of a transmitter 12 having an impulse response F(t), a communication channel 14 with additive white Gaussian noise (AWGN), a receiver 16 with impulse response f(t), a sampler 18 that periodically samples the output of the receiver 16, and a symbol detector 20. In general, the transmitter 12 receives an input data sequence which represents information to be transmitted. The input data sequence is assumed to be in digital form. The transmitter 16 modulates a carrier signal with the input sequence using a M-ary modulation scheme such as pulse amplitude modulation (PAM) or quadrature amplitude modulation (QAM). The input data sequence is sub-divided into k bit symbols, and each symbol is represented by a distinct signal waveform referred to herein as the transmitted signal. The transmitted signal is subjected to disturbances in the communication channel 14 which may result in phase and/or amplitude distortion. The transmitted signal is also degraded by added noise. The channel corrupted signal is received at the receiver 16. The signal received at the receiver is referred to herein as the received signal $y_i$.

The receiver 16 has an impulse response f(t) which is ideally matched to the impulse response F(t) of the transmitter 12. In actual practice, the ideal receiver 16 may not be realizable, so an approximation of the ideal receiver 16 may be used. The output of the receiver 16 is sampled periodically by the sampling circuit 18. A timing signal extracted from the received signal $y_i$ is used as a clock for sampling the received signal $y_i$. The sampled and filtered received signal $y_i$ is passed to the detector 20. The purpose of the detector 20 is to estimate a transmitted sequence $s_m$ which is contained in the received signal $y_i$.

In a digital communication system that transmits information over a channel that causes ISI, the optimum detector is a maximum likelihood symbol sequence detector (MLSD) which produces the most probable symbol sequence for a given received symbol sequence. A decision rule is employed based on the computation of the posterior probabilities defined as $$P(s_m|y_i), m=1,2,\ldots,M \tag{1}$$

where $s_m$ is the transmitted sequence, and y0i is the received signal. The decision criterion is based on selecting the sequence corresponding to the maximum of the set of posterior probabilities $\{P(s_m)\}$. This criterion maximizes the probability of a correct decision and, hence, minimizes the probability of error. This decision criterion is called the maximum a posteriori probability (MAP) criterion.

Using Bayes rule, the posterior probabilities may be expressed as $$P(s_m|y_i) = \frac{f(y_i|s_m)P(s_m)}{f(y_i)} \tag{2}$$

where $f(y_i|s_m)$ is a conditional probability density function (p.d.f.) of the observed vector y given the transmitted sequence $s_m$, and $P(s_m)$ is the a priori probability of the $m^{th}$ signal being transmitted. Computation of the posterior probabilities $P(s_m|y_i)$ requires knowledge of the a priori probabilities $P(s_m)$ and the conditional p.d.f. $f(y_i|s_m)$ for m=1,2, . . . ,M. The conditional p.d.f. is called the likelihood function.

Some simplification occurs in the MAP criterion when the M signals are equally probable a priori, i.e., $P(s_m)=1/M$ for all M. Furthermore, it should be noted that the denominator in Equation (2) is independent of which signal of the M signals is transmitted. Consequently, the decision rule based on finding the signal that maximizes the posterior probability $P(s_m|y_i)$ is equivalent to finding the signal that maximizes the likelihood function $f(y_i|s_m)$.

In the case of a faded and dispersive channel with additive, white Guassian noise AWGN, the received signal is assumed to be in the form:

$$y_i = \sum_{l=1}^{L} s_l g_{i-1,l} + w_i \tag{3}$$

where $y_i$ is the received signal at time i, $s_l$ is the l'th transmitted symbol, $g_{i-l,l}$ is a channel impulse response that symbol s. contributes to the received signal at time i, and $w_i$ is the noise at time i. This model corresponds to a received signal $y_i$ having symbol-spaced echoes and Nyquist matched filtering.

A conventional log-likelihood function used in the receiver is written as follows:

$$\log(y_i|s,g) = \sum_{l=-L}^{L} \left[ -2Re\{s_l^* r_l\} + \sum_{m=1}^{L} s_l^* h_{l,m} s_m \right] \tag{4}$$

where $$r_l = \sum_{k=0}^{K-1} g_{K,k+1,l}^H y_{k+l} \tag{5}$$

and $$h_{l,m} = \sum_{k=0}^{K-1} g_{k-1,l}^H g_{k-m,m} \tag{6}$$

The term $r_l$ represents a matched medium response of the receiver to both the transmitter and the channel for symbol l. The term $h_{l,m}$ represents the complex ISI between adjacent symbols generated by the multipath component and the pulse-shape waveform. The symbol $g_{i-l,l}^H$ is the conjugate transpose of the channel impulse response .

The method of the present invention represents the l'th symbol, $s_l$, received during a given sampling interval, as a function of two vectors which can be described mathematically as follows:

$$s_l = Z_l^T B_l \tag{7}$$

where $Z_l$ is an indicator vector and $B_l$ is a symbol library vector. It should be noted that the symbol library vector $B_l$ may be fixed for all values of l, in which case the modulation does not vary over time (e.g. QPSK). The symbol library vector $B_l$ could be varied over time to represent a coded modulation sequence. The symbol library vector $B_l$ contains as elements all possible transmitted symbols. The indicator vector $Z_l$ contains a plurality of elements consisting of a single element equal to "1" and all remaining elements equal to "0". The number of elements in the indicator vector $Z_l$ is equal to the number of elements (or symbols) in the symbol library vector $B_l$. Consequently, the position of the "1" element within the indicator vector uniquely identifies a symbol which is located at the same position in the symbol library vector $B_l$ For example, an indicator vector with a "1" element in the 3'rd position indicates that the 3'rd element of the symbol library vector $B_l$ was transmitted.

Using indicator vector notation and substituting the variables U and V, the log-likelihood function of equation (4) becomes:

$$\log(y|s,g) = \sum_{l=1}^{L} Z_l^T \left[ U_l + \sum_{m=1}^{L} V_{l,m} Z_m \right] \tag{8}$$

where;

$$U_l = -2Re\{B_l^* r_l\} \tag{9}$$

is a matched medium response vector for the possible transmitted symbols $b_l$; and $$V_{l,m} = B_l^* B_l^T h_{l,m} \tag{10}$$

is an an interaction matrix that represents the ISI between the received symbols and their neighbor symbols. The term neighbor symbols is used herein to mean symbols in the local neighborhood of a given received symbol which induce ISI in the given received symbol. As will be described below, the log-likelihood function of equation (8) is used as a convergence criteria in the iterative calculation of the estimated symbol probability vector $\hat{Z}_l$ for a given received symbol $s_l$.

In accordance with the present invention, an iterative approach is used to find an estimate $\hat{Z}_l$ of the indicator vector $Z_l$ for each transmitted symbol. This estimate is referred to herein as the estimated symbol probability vector $\hat{Z}_l$ and has t'th element $\hat{Z}_{l,t}^{(p)}$ given by the equation:

$$\hat{Z}_{l,t}^{(p)} = \frac{\exp\left(e_t^T\left[U_l + \sum_{m \in n_l} V_{l,m}(u,v)(e_t + \hat{z}_m^{(p-1)})\right]\right)}{\sum_{s=1}^{N_b} \exp\left(e_s^T\left[U_l + \sum_{m \in n_l} V_{l,m}(e_s + \hat{z}_m^{(p-1)})\right]\right)} \quad (11)$$

where $e_t$ represents an indicator vector having a "1" as the value of the t'th element, while all other elements have a value of "0". The term $\hat{Z}_m^{(p-1)}$ represents estimated symbol probability vectors for the previous iteration of the neighbor (i.e. interfering) symbols. $N_b$ is the number of possible symbols in the symbol library vector $B_l$ and $n_l$ defines the estimated indicator vectors $\hat{Z}_m$ in the local neighborhood of $s_l$. The numerator of equation (11) is referred to as the partial metric parameter and the denominator is referred to as the normalizing parameter.

The approach to calculating the estimated symbol probability vector $\hat{Z}_l^{(p)}$ and hence the received symbol $s_l$, is recursive or iterative in nature to account for the interference from adjacent sampling intervals, also known as ISI. ISI, by definition, implies that a given sampling interval not only contains information related to the symbol directly associated with that sampling interval, but also contains information related to symbols received in adjacent sampling intervals. Consequently, in order to accurately estimate the value of a symbol at a given sampling interval, knowledge of the contents, or estimated contents, of adjacent sampling intervals is also required. Equation (11) defines a recursive relation between the estimate of the symbol probability vector for a particular symbol at the p'th iteration and the estimated symbol probability vectors corresponding to the interfering neighbors of that symbol at the previous (p−1)'th iteration.

In the initial iteration (p=1) of equation (11), an assumed value for each element of each estimated symbol probability vector $\hat{Z}_m^{(o)}$ is used. After the first iteration (p>1), the estimated symbol probability vectors $\hat{Z}_l$ from the (p−1)'st iteration are used in the calculation and are designated in equation (11) as $\hat{Z}_m$. Each iteration results in an updated set of estimated symbol probability vectors $\hat{Z}_l$, one for each symbol being estimated. This process is repeated for a pre-determined number of iterations or until some pre-defined convergence criteria is satisfied.

In the iterative calculation of estimated symbol probability vectors $\hat{Z}_l$, some function $f(\hat{Z}_m^{(p-1)})$ of the previous iteration of the estimated symbol probablity vectors $\hat{Z}_m^{(p-1)}$ in equation (11) could be used in place of the estimated symbol probablity vectors $\hat{Z}_m^{(p-1)}$. This function $f(\hat{Z}_m^{(p-1)})$ may output a hard decision in which each element of the estimated symbol probablity vector $\hat{Z}_m^{(p-1)}$ takes on a value of 0 or 1. Alternatively, the function $f(\hat{Z}_m^{(p-1)})$ could be a continuous non-linear function that produces an output for each element of the estimated -symbol probablity vector $\hat{Z}_m^{(p-1)}$ in the range from 0 to 1, where the sum across all elements is exactly 1.

As described above, during each iteration a complete set of estimated symbol probability vectors $\hat{Z}_l$ must be calculated. Consequently, application of equation (11) is required $N_b$ times for each of the L members of the estimated symbol probability vector $\hat{Z}_l$. That is, since there are L sampling intervals under consideration, there are consequently L distinct estimated symbol probability vectors, $\hat{Z}_l$ through $\hat{Z}_l$, with each vector containing as many elements as there are symbols in the symbol library, $N_b$. At the conclusion of each iteration, there will be a set of estimated symbol probability vectors corresponding to each of the transmitted symbols. A determination is then made whether an additional iteration is required. If so, the calculations of the estimated symbol probability vectors is repeated resulting in updated estimates. This process is repeated for a predetermined number of iterations or until some pre-defined convergence criteria is satisfied.

The log-likelihood equation (8) may, for example, be used to test for convergence. After each iteration, the entire set of estimated symbol probability vectors $\{\hat{Z}_1, \hat{Z}_2, \ldots \hat{Z}_L\}$ is applied to the log-likelihood equation (8) resulting in a numerical value which reflects the likelihood that the set of estimated symbol probability vectors $\{\hat{Z}_1, \hat{Z}_2, \ldots \hat{Z}_L\}$, and more specifically the symbols that they represent, accurately reflect the actual symbols sent by the transmitter. When further iteration is deemed unnecessary, the set of estimated symbol probability vectors $\{\hat{Z}_1, \hat{Z}_2, \ldots \hat{Z}_L\}$ can be queried as to their contents. The individual elements of the estimated symbol probability vectors $\hat{Z}_l$ may take on real values ranging from 0 to 1, and reflect the probabilities that the corresponding symbols in the associated symbol library vector $B_l$ were transmitted. These probabilities may then be used to assist in performing either a soft-decision or a hard decision with regard to the symbol or symbol sequence in question.

To those skilled in the art it will become apparent that the detection method of the present invention, which is described above for the case of a single user signal, can easily be extended to include the case of multiple user signal. An implementation of the multiple user configuration contemplated would necessarily require minor alterations to the mathematical expressions previously described for the single user configuration. However, the basic functional intent of these expressions remains unchanged.

Specifically, in the multiple user instance, equation (3) would appear as follows:

$$y_l = \sum_{u=1}^{N_u} \sum_{l=1}^{L} s_{l,u} g_{i-1,i}(u) + w_i \quad (12)$$

where an additional summation over the entire user population, $N_u$, has been added. Likewise, equation (4) assumes the following form in the multiple user scenario:

$$\log(y|s,g) = \sum_{u=1}^{N_u} \sum_{l=1}^{L} \left[-2Re\{s_{l,u}^* r_l\} + \sum_{v=1}^{N_u} \sum_{m=1}^{L} s_{l,u}^* h_{l,m}(u,v) s_{m,v}\right] \quad (13)$$

where, $$r_{l,u} = \sum_{k=0}^{K-1} g_{k,k+l}(u) y_{k+l} \quad (14)$$

and $$h_{l,m(u,v)} = \sum_{k=0}^{K-1} g_{k-l,l}^H(u) g_{k-m,m}(v) \quad (15)$$

In this case, $s_{k,u}$ is the l'th symbol for user u, and $g_{k-l,i}(u)$ is a channel impulse response contributing to the received signal at time l and delay k-l for the user u. The term $h_{l,m}(u,r)$ represents the interaction between users u and v. Once again, only additional summations over the user population, $N_u$, have been added.

When converted to indicator vector form, the log-likelihood equations becomes:

$$\log(y|s, g) = \sum_{u=1}^{N_u} \sum_{l=1}^{L} Z_{l,u}^T \left[ U_{l,u} + \sum_{v=1}^{N_u} \sum_{m=1}^{L} V_{l,m}(u, v) Z_{m,v} \right] \quad (16)$$

where $$U_{l,u} = -2 Re B_{l,u}^* r_{l,u} \quad (17)$$

and $$V_{l,m}(u, v) = B_{l,u}^* B_{m,v}^T h_{l,m}(u, v) \quad (18)$$

The estimated symbol probability equation becomes:

$$\hat{Z}_{l,u}^{(p)} = \frac{\exp\left( e_l^T \left[ U_{l,u} + \sum_{m \in n_l} V_{l,m}(u, v)(e_l + \hat{Z}_{m,v}^{(p-1)}) \right] \right)}{\sum_{s=1}^{N_b} \exp\left( e_s^T \left[ U_{l,u} + \sum_{m \in n_l} V_{l,m}(u, v)(e_s + \hat{Z}_{m,v}^{(p-1)}) \right] \right)} \quad (19)$$

Figure 2:
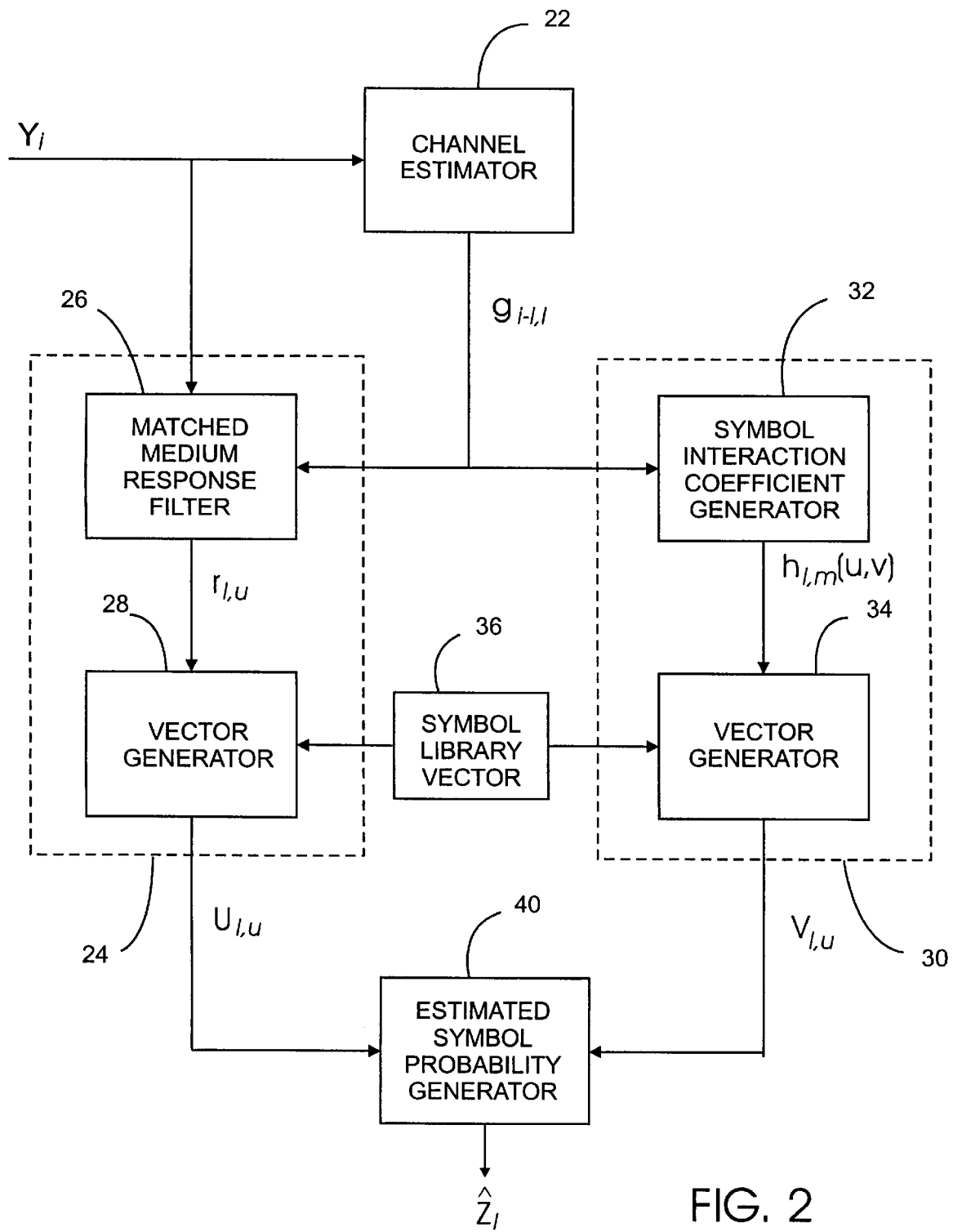
FIG. 2 is a block diagram of a detector in accordance with the present invention.

FIG. 2 illustrates the detector 20 for detecting a received signal $y_i$ from multiple users. The detector 20 includes a channel estimator 22, a matched medium response vector generator 24, and a symbol interaction matrix generator 30. The channel estimator 22 generates an estimate of the channel impulse response $g_{i-1,l}$ based on the received signal $y_i$. The term $g_{i-1,l}$ represents the channel impulse response corresponding to the l'th symbol with a delay factor of i-1. The estimate of the channel impulse response $g_{i-1,l}$ is computed in a known manner. Known training symbols can be used to generate channel estimates. Alternatively, hard or soft detected symbols can also be used to generate channel estimates. The estimate of the channel impulse response $g_{i-1,l}$ is passed to the matched medium response vector generator 24 and the symbol interaction matrix generator 30.

The matched medium response vector generator 24 includes a matched medium response filter 26 and a vector generator 28. The matched medium response filter 26 computes -the matched medium response $r_{l,u}$ to both the transmitter and the channel medium for symbol l for each user u given the received signal y0i and the estimate of the channel impulse response $g_{i-1,l}(u)$. The matched medium response $r_{l,u}$ is then passed to the vector generator 28, which in conjunction with knowledge of a symbol library 36 computes a matched medium response vector, $U_{l,u}$.

The symbol interaction matrix generator 30 includes an interaction coefficient generator 32 and a matrix generator 34. The interaction coefficient generator 32 computes the symbol interaction coefficient, $h_{l,m}(U,v)$, which is indicative of the channel response for symbols l and m for each user pair u,v. The symbol interaction coefficient $h_{l,m}(u,v)$ is passed to the matrix generator 34 which, in coordination with information in the symbol library 36, generates the symbol interaction matrix, $V_{l,m}$. The matched medium response vector, $U_{i,u}$, and the symbol interaction matrix, $V_{l,m}(u,v)$, are finally passed to an estimated symbol probability vector generator 40, which computes the estimated symbol probability vector, $\hat{Z}_l$ in accordance with equation (16).

Figure 3:
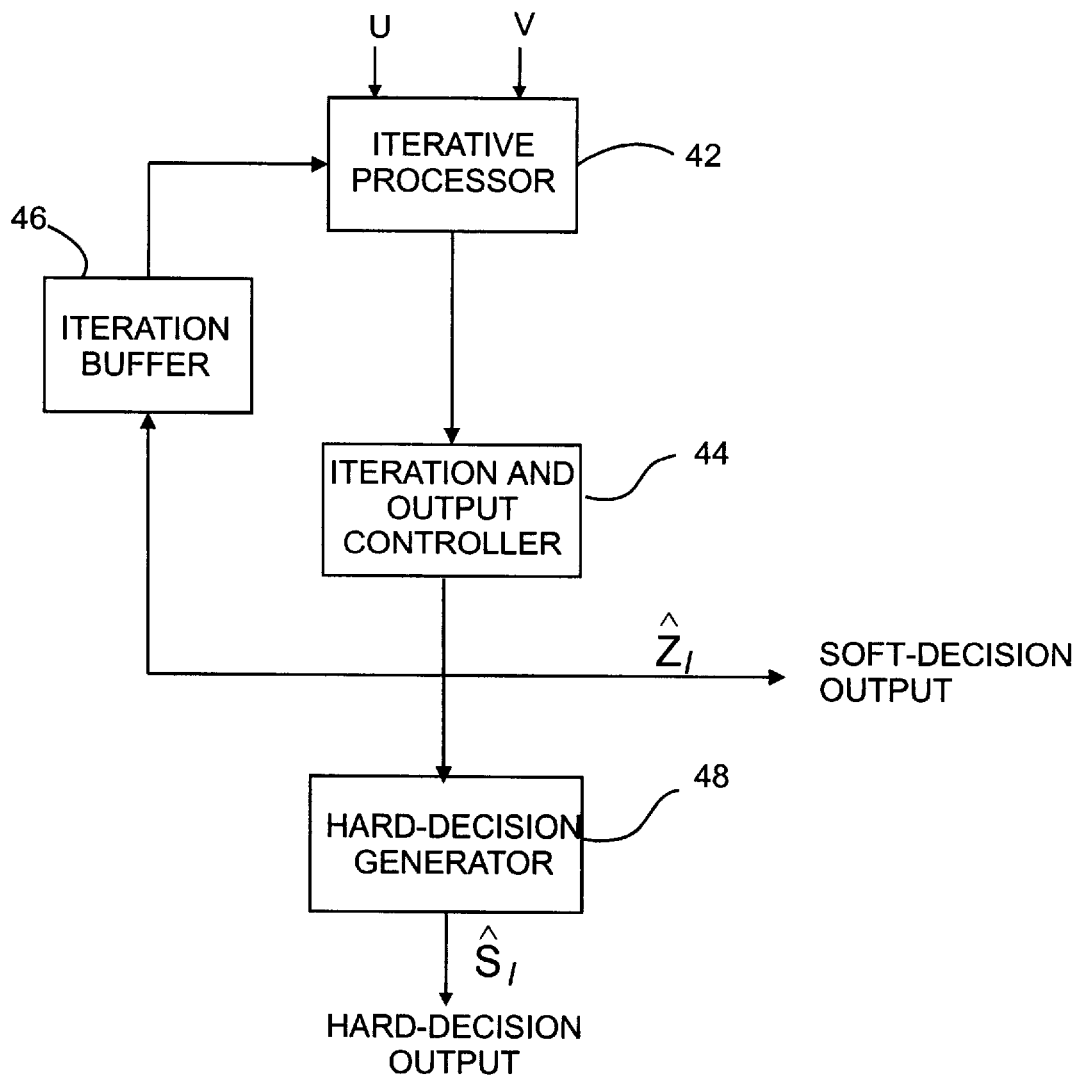
FIG. 3 is a block diagram of an estimated indicator vector generator.

Shown in FIG. 3 is a more detailed schematic diagram of the estimated symbol probability vector generator 40. The estimated symbol probability vector generator 40 is comprised of an iterative processor 42, an iteration and output controller 46, and a previous iteration buffer 44. The iterative processor 42 is responsible for implementing and solving the mathematical expressions that describe and define the estimated symbol probability vector, $\hat{Z}_{l,u}$, for a given symbol, l and user u in the multi-user embodiment. The output of the iterative processor 42 is an estimated indicator vector, $\hat{Z}_{l,u}$, which is received and analyzed by the iteration and output controller 46.

The controller 46 implements a particular strategy for determining whether an additional iteration is required. Potential iteration control strategies could include defining a fixed number of iterations, or the observing and monitoring a Z dependent function, such as the log-likelihood function previously described. In such a case, the decision regarding the need for an additional iteration could be determined by observing the mean squared error between successively computed $\hat{Z}_l$ vectors. Should the controller 46 determine that an additional iteration is required, the newly computed set of estimated symbol probability vectors, $\{\hat{Z}_1, \hat{Z}_2, \ldots \hat{Z}_l\}$, is temporarily stored in the iteration buffer 44. The set of estimated symbol probability vectors $\{\hat{Z}_1, \hat{Z}_2, \ldots \hat{Z}_l\}$ stored in the iteration buffer 44 are then used in the computation of estimated symbol probability vectors during the next iteration.

Regardless of the iteration control strategy implemented, the function of the controller 46 is to administer the implemented iteration termination criteria, and ultimately output the iteratively optimized estimated symbol probability vector, $\hat{Z}_{l,u}$. The estimated symbol probability vector $\hat{Z}_{l,u}$ may be used by a hard-decision generator 48 to make a hard-decision about estimated symbol probability vector $\hat{Z}_{l,u}$ into estimated symbol $\hat{s}_{l,u}$. The estimated symbol $\hat{s}_{l,u}$ is then output from the hard-decision generator 48 to a decoder. Alternatively, the estimated symbol probability vector $\hat{Z}_{l,u}$ may be passed directly to a soft-decision decoder.

Figure 4:
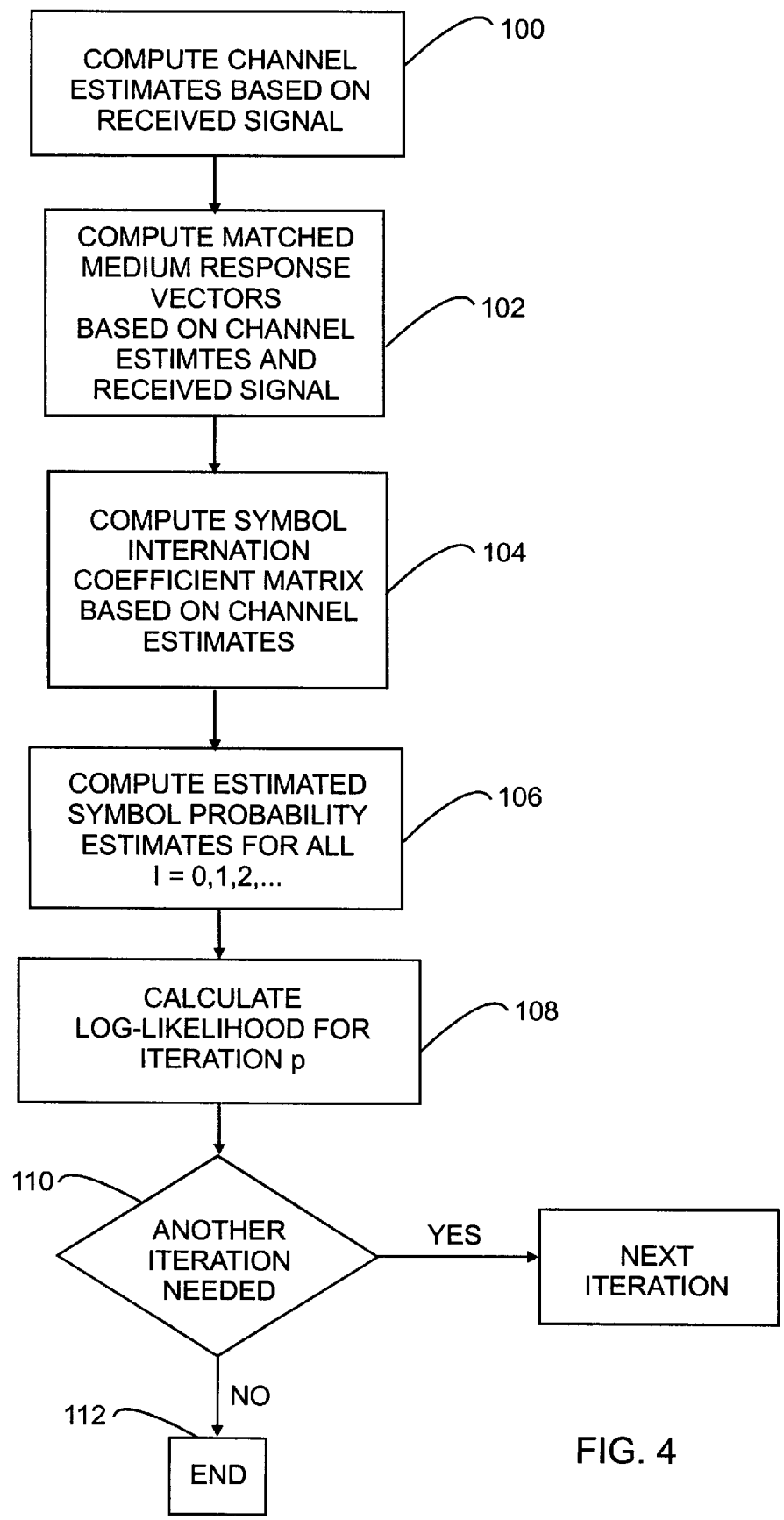
FIG. 4 is a flow diagram illustrating the detection method of the present invention.

FIG. 4 is a flow diagram illustrating the operation of the detector 20 of the present invention. After receiving the received signal $y_i$, the detector 20 computes channel estimates $g_{i-1,l}$ which represent the estimated impulse response of the communication channel to the transmitted symbols (block 100). The detector 20 then computes the matched medium response vector $U_{l,u}$ (block 102) and the symbol interaction coefficients matrix $V_{l,u}$ (block 104). The matched medium response vector $U_{l,u}$ is calculated based on the channel estimates $g_{i-1,l}$ and the received signal $y_i$. The symbol interaction coefficients matrix $V_{l,u}$ is computed based on the channel estimates $g_{i-1,l}$ and represents the interaction between adjacent symbols. The matched medium response vectors $U_{l,u}$ and the symbol interaction coefficient matrix $V_{l,u}$ are then used to compute estimated symbol probability vectors $\{\hat{Z}_0, \hat{Z}_1, \hat{Z}_2 \ldots\}$ for each received symbol (block 106). The log-likelihood for the set of estimated symbol probability vectors is then calculated using the log-likelihood equation (block 108). The log-likelihood results in a numerical value which reflects the likelihood that the set of estimated symbol probability vectors $\{\hat{Z}_0, \hat{Z}_1, \hat{Z}_2 \ldots\}$ accurately represents the set of transmitted symbols. The detector 20 then determines whether another iteration is required (block 110), using, for example, some predetermined convergence criteria. If so, a new set of estimated symbol probability vectors for each received symbol are computed (block 106). The log likelihood based on this new set of estimated symbol probability vectors is then calculated (block 108). This process is repeated until the detector 20 determines that no further iterations are required (block 110). The final set of estimated symbol probability estimates are then used to generate hard decision estimates of the transmitted symbols, or, alternatively, are output to a soft decision decoder (block 112).

Based on the foregoing, it is seen that the present invention provides an alternative approach to finding maximum likelihood sequence estimates which may be considered when the state space is too large for a conventional Viterbi detector. The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for demodulating a received signal corresponding to a transmitted symbol sequence having a plurality of symbols comprising the steps of:

a) receiving the signal over a communication channel;
    b) forming a symbol library vector representing possible transmitted symbols in the transmitted symbol sequence;
    c) generating channel estimates representing the estimated impulse response of the communication channel to each transmitted symbol;
    d) forming a matched medium response vector based upon the received signal, the channel estimates, and the symbol library vector;
    e) forming an interaction matrix based upon the channel estimates and the symbol library vector; and
    f) forming an estimated symbol probability vector having a plurality of elements for selecting an estimate of each transmitted symbol in the transmitted symbol sequence, wherein the estimated symbol probability vector is formed by recursively estimating each element of each estimated symbol probability vector based upon the matched medium response vector, the interaction matrix, and a previous estimate of the estimated symbol probability vector for interfering symbols.

2. The demodulation method according to claim 1 wherein the recursive estimation of each element of each estimated symbol probability vector is performed until a pre-defined convergence criteria is satisfied.

3. The demodulation method according to claim 1 wherein the recursive estimation of each element of each estimated symbol probability vector is performed for a pre-determined number of iterations.

4. The demodulation method according to claim 1 wherein the estimated symbol probability vector is output as a soft decision vector.

5. The demodulation method according to claim I further including the step of selecting a symbol from the symbol library vector based upon the estimated symbol probability vector and outputting the selected symbol as a hard decision.

6. The demodulation method according to claim 1 further including the step of regenerating the channel estimates during the iterative calculation of the estimated symbol probability vectors.

7. The demodulation method according to claim 1 wherein a function of the previous estimated symbol probability vector is used to calculate the estimate for the symbol probability vector on the next iteration.

8. A method for demodulating multiple user signals each of which corresponds to a transmitted symbol sequence having a plurality of symbols, said demodulation method comprising the steps of:

a) receiving said multiple user signals over a communication channel;
    b) forming a symbol library vector for each user signal representing possible transmitted symbols in the transmitted symbol sequence;
    c) generating channel estimates representing estimated impulse responses of the communication channel to each transmitted symbol in each of the user signals;
    d) forming a matched medium response vector for each of the user signals based upon the user signal, the corresponding channel estimates and the corresponding symbol library vectors;
    e) forming an interaction matrix for each of the user signals based upon the corresponding channel estimates and the symbol library vector; and
    f) forming estimated symbol probability vectors having a plurality of elements for selecting an estimate of each transmitted symbol in each of the user signals, wherein said estimated symbol probability vectors are formed by recursively estimating each element of each of the estimated symbol probability vectors based upon the matched medium response vector, the interaction matrix, and a previous estimate of the estimated symbol probability vector for interfering symbols.

9. The demodulation method according to claim 8 wherein each element of the estimated symbol probability vectors is calculated recursively based upon a previous estimate of the estimated symbol probability vector.

10. The demodulation method according to claim 8 wherein the recursive estimation of each element of each of the estimated symbol probability vectors is performed until a predefined convergence criteria is satisfied.

11. The demodulation method according to claim 8 wherein the recursive estimation of each element of each of the estimated symbol probability vectors is performed for a predetermined number of iterations.

12. The demodulation method according to claim 8 wherein the estimated symbol probability vector is output as a soft decision vector.

13. The demodulation method according to claim 8 further including the step of selecting a symbol from the symbol library vector based upon the indicator vector and outputting the selected symbol as a hard decision.

14. The demodulation method according to claim 8 further including the step of regenerating the channel estimates during the iterative calculation of the estimated symbol probability vectors.

15. The demodulation method according to claim 8 wherein a function of the previous estimated symbol probability vector is used to calculate the estimate for the symbol probability vector on the next iteration.

16. A method for demodulating a received signal corresponding to a transmitted symbol sequence having a plurality of symbols comprising the steps of:

a) receiving a signal over a communication channel;
    b) forming a symbol library vector representing possible transmitted symbols in the transmitted symbol sequence;
    c) generating channel estimates representing the estimated impulse response of the communication channel to each transmitted symbol;
    d) forming a matched medium response vector based upon the received signal, the channel estimates, and the symbol library vector;
    e) forming an interaction matrix based upon the channel estimates and the symbol library vector; and
    f) forming an estimated symbol probability vector based upon said matched medium response vector and said interaction matrix for selecting an estimate of each transmitted symbol, wherein said estimated symbol probability vector includes a plurality of elements corresponding to the elements of the symbol library vector, and wherein each element of the estimated symbol probability vector represents the probability of the corresponding element in the symbol library vector being the transmitted symbol.

17. The demodulation method according to claim 16 wherein the estimated symbol probability vector is output as a soft decision vector.

18. The demodulation method according to claim 16 further including the step of selecting a symbol from said symbol library vector based upon said indicator vector and outputting said selected symbol as a hard decision.

19. The demodulation method according to claim 16 further including the step of regenerating the channel estimates during the iterative calculation of the estimated symbol probability vectors.

* * * * *

UNITED STATES PATENT AND TRADEMARK OFFICE
CERTIFICATE OF CORRECTION

PATENT NO. : 5,887,035
DATED : March 23, 1999
INVENTOR(S) : Karl J. Molnar

It is certified that error appears in the above-identified patent and that said Letters Patent is hereby corrected as shown below:

Column 3:
Equation (3), beginning around line 60, please delete:

$$\text{``}y_i = \sum_{l=1}^{L} s_l g_{i-1,l} + w_i\text{''}$$

And insert therefor:

$$-- y_i = \sum_{l=1}^{L} s_l g_{i-1,l} + w_i --.$$

Column 4:
Equation (5), beginning around line 9, please delete:

$$\text{``}r_l = \sum_{\lambda=0}^{K-1} g^{H}_{K,k+1,l} y_{k+l}\text{''}$$

And insert therefor:

$$-- r_l = \sum_{k=0}^{K-1} g^{H}_{k,k+l,l} y_{k+l} --.$$

Equation (6), beginning around line 13, please delete:

$$\text{``}h_{l,m} = \sum_{\lambda=0}^{K-l} g^{H}_{k-l,l} g_{k-m,m}\text{''}$$

And insert therefor:

$$-- h_{l,m} = \sum_{k=0}^{K-l} g^{H}_{k-l,l} g_{k-m,m} --.$$

UNITED STATES PATENT AND TRADEMARK OFFICE
CERTIFICATE OF CORRECTION

PATENT NO. : 5,887,035
DATED : March 23, 1999
INVENTOR(S) : Karl J. Molnar

It is certified that error appears in the above-identified patent and that said Letters Patent is hereby corrected as shown below:

Column 6:
Equation (12), beginning around line 42, please delete:

$$\text{``}y_i = \sum_{u=1}^{N_u} \sum_{l=1}^{L} s_{i,u} g_{i-1,l}(u) + w_i\text{''}$$

And insert therefor:

$$-- y_i = \sum_{u=1}^{N_u} \sum_{l=1}^{L} s_{i,u} g_{i-1,l}(u) + w_i --.$$

Equation (15), beginning around line 58, please delete:

$$\text{``}h_{l,m(u,v)} = \sum_{\lambda=0}^{K-1} g_{k-l,l}^{H}(u) g_{k-m,m}(v)\text{''}$$

And insert therefor:

$$-- h_{l,m(u,v)} = \sum_{k=0}^{K-1} g_{k-l,l}^{H}(u) g_{k-m,m}(v) --.$$

Signed and Sealed this

Thirty first Day of July, 2001

*Attest:*

*Attesting Officer*

NICHOLAS P. GODICI
*Acting Director of the United States Patent and Trademark Office*